United States Patent [19]

Muench

[11] Patent Number: 5,400,115
[45] Date of Patent: Mar. 21, 1995

[54] PRINTER HAVING A MEASURING UNIT ADJUSTABLE TO THE SPECTRAL SENSITIVITY OF A COPY MATERIAL

[75] Inventor: Reimund Muench, Munich, Germany

[73] Assignee: Agfa-Gevaert Aktiengesellschaft, Leverkusen, Germany

[21] Appl. No.: 116,356

[22] Filed: Sep. 2, 1993

Related U.S. Application Data

[63] Continuation-in-part of Ser. No. 978,238, Nov. 18, 1992, abandoned.

[30] Foreign Application Priority Data

Dec. 20, 1991 [DE] Germany .............................. 4142435

[51] Int. Cl.[6] .................... G03B 27/30; G03B 27/32
[52] U.S. Cl. ......................... 355/38; 355/68; 355/77; 356/221; 356/224
[58] Field of Search ................. 355/35, 38, 68, 77, 355/32; 356/188, 405, 218, 219, 221, 223, 222, 224, 225, 226

[56] References Cited

U.S. PATENT DOCUMENTS

| | | | |
|---|---|---|---|
| 4,090,792 | 5/1978 | Bunge | 356/188 |
| 5,115,270 | 5/1992 | Kraft et al. | 355/38 |
| 5,214,494 | 5/1993 | Inaba et al. | 356/419 |
| 5,272,518 | 12/1993 | Vincent | 356/405 |

FOREIGN PATENT DOCUMENTS 55-006365 1/1980 Japan.
3-230145 10/1991 Japan.

Primary Examiner—D. Rutledge
Attorney, Agent, or Firm—Darby & Darby

[57] ABSTRACT

A printer has a light source and an objective which direct a light beam along a predetermined path, and a unit in the path for measuring the density of a master to be reproduced. The measuring unit includes a filter combination of at least two filters downstream of the objective and a light sensor downstream of the filter combination. The filter combination has a transmission pattern which shifts as the angle of incidence of the light beam on one or more of the filters changes. At least one of the filters is pivotable in order to vary the angle of incidence of the light beam on the same. This allows the transmission pattern to be shifted so as to adjust the measuring unit to the spectral sensitivity of the copy material used for reproduction of the master.

30 Claims, 5 Drawing Sheets

PRINTER HAVING A MEASURING UNIT ADJUSTABLE TO THE SPECTRAL SENSITIVITY OF A COPY MATERIAL

CROSS-REFERENCE TO RELATED APPLICATION

This is a continuation-in-part of application Ser. No. 07/978,238, filed Nov. 18, 1992, abandoned.

BACKGROUND OF THE INVENTION

The invention relates generally to the making of color prints from a master or original.

More particularly, the invention relates to a method of and apparatus for adjusting a color density measuring unit for a master to the spectral sensitivity of the copy material on which a print of the master is to be made.

To obtain optimal exposure times for a photographic copy material when using a measuring unit which measures the color density of the master, it is necessary for the spectral sensitivity of the measuring unit to be as close as possible to the spectral sensitivity of the copy material.

To this end, the European patent application 0 420 816 discloses a photographic color copying apparatus with a measuring unit in which the spectral transmission lines of measuring filters, i.e. color filters, are shifted as a function of the angle of incidence of light on a measuring filter. The measuring filter is stationary and cooperates with at least two separate light sensors. The sensors are situated in such a manner that each receives light from a different angular range of the cone of measuring light coming from the filter. This arrangement requires a large number of sensors in order to span as large an angle as possible. Aside from the increased cost for the large number of sensors, the maxima of the spectral ranges detected by different sensors are spaced from one another by a predetermined distance. Due to the geometry of the known arrangement, this spacing cannot be reduced at will. The measuring unit is adjusted to the spectral sensitivity of a master using measurement signals from the sensor which detects the spectral region most closely approximating the spectral sensitivity of the copy material. When many different copy materials are employed, it can happen that the maximum of the spectral sensitivity of a copy material lies between the maxima of the spectral regions detected by the sensors. Color falsification can then occur.

SUMMARY OF THE INVENTION

It is an object of the invention to provide a method which allows the number of light sensors to be reduced.

Another object of the invention is to provide a method which enables the spectral sensitivity of a density measuring unit to be closely matched to the spectral sensitivity of a copy material.

An additional object of the invention is to provide a method which permits a close match to be achieved between the maximum spectral sensitivity of a copy material and the maximum of a detected spectral range.

A further object of the invention is to provide an apparatus which makes it possible to reduce the number of light sensors.

It is also an object of the invention to provide an apparatus which allows the spectral sensitivity of a density measuring unit to be closely matched to the spectral sensitivity of a copy material.

Yet another object of the invention is to provide an apparatus which enables a close match to be obtained between the maximum spectral sensitivity of a copy material and the maximum of a detected spectral range.

The preceding objects, as well as others which will become apparent as the description proceeds, are achieved by the invention.

One aspect of the invention resides in a method of printing a master on copy material having a predetermined spectral sensitivity. The method comprises the steps of measuring the density of the master using measuring means which includes a plurality of elements transparent to radiation, and adjusting the measuring means to the predetermined spectral sensitivity of the copy material. The measuring means has a transmission pattern which shifts in dependence upon the angle of incidence of radiation on the transparent elements, and the adjusting step includes moving at least one of the transparent elements independently of another of the transparent elements so as to change the angle of incidence of radiation on the displaced element. One or more of the transparent elements is preferably constituted by a color filter, e.g., an interference filter or a mass filter.

The operation of moving a transparent element may involve rotation or pivoting of the latter.

The adjusting step may further comprise directing a beam of radiation towards the transparent elements, and restricting the wavelengths of the beam to a narrow range.

The adjusting step may additionally comprise determining the intensity of the beam following passage of the beam through the transparent elements. The adjusting step may then involve changing the position of a transparent element with reference to the beam in dependence upon the intensities obtained during the determination procedure.

The transmission pattern of the measuring means, which is an overall transmission pattern derived from the respective transmission patterns of the individual transparent elements, may have an ascending leg or flank as well as a descending leg or flank. The adjusting step can here include shifting the ascending leg differently from the descending leg. The operation of shifting the ascending leg of the overall transmission pattern differently from the descending leg can be accomplished through appropriate selection of the individual transparent elements. Such operation can also be carried out by moving one of the elements through a first distance and either moving another of the elements through a different second distance or maintaining the other element or elements stationary.

A first one of the transparent elements can have an individual transmission pattern which again includes an ascending leg or flank and a descending leg or flank, and a second one of the elements can be substantially transparent in a predetermined wavelength range. The transparent elements may be selected in such a manner that one leg of the individual transmission pattern is located in the predetermined range, and the adjusting step then comprises shifting the leg and range relative to one another.

It is further possible for one of the transparent elements to have an individual transmission pattern which includes an ascending leg and a descending leg while a second one of the elements is substantially opaque in a preselected wavelength range. If the transparent elements are designed so that one leg lies in the preselected range, the adjusting step can once more include shifting such leg and range relative to one another. Here, it is preferred for the adjusting step to be performed in such a manner that the leg in the preselected range always remains in the range.

The measuring step is advantageously carried out in a photographic printer and the measuring means, which is then disposed in the printer, can include a sensor for determining radiation intensity. The measuring step may comprise exposing the master to radiation and directing radiation from the master to the sensor. The adjusting step including exposing a calibration master to radiation and directing radiation from said calibration master to said sensor.

The adjusting step preferably includes evaluating a calibra-tion master in the copier. To this end, the adjusting step can comprise exposing the calibration master to radiation and directing radiation from the calibration master to the sensor of the measuring means.

Another aspect of the invention resides in an apparatus for printing a master. The apparatus comprises means for measuring the density of the master, and the measuring means includes a plurality of elements which are transparent to radiation. The measuring means has a transmission pattern which shifts in dependence upon the angle of incidence of radiation on the transparent elements. The apparatus further comprises means for moving at least one of the transparent elements independently of another of the elements so as to change the angle of incidence of radiation on the displaced element. One or more of the transparent elements preferably comprises a color filter.

The moving means may be designed to rotate or pivot a transparent element. Moreover, the moving means can be arranged to move only a single one of the transparent elements or to move two or more of the elements. In the latter case, the moving means may comprise means for moving an element independently of the other element or elements.

The apparatus can further comprise means for directing radiation towards the transparent elements along a predetermined path, and means for restricting the radiation to a narrow wave-length range. The measuring means may include means downstream of the elements for determining the intensity of the radiation and the determining means may comprise a sensor having an active surface of predetermined diameter. If only a single one of the transparent elements is movable, this diameter preferably exceeds twice the thickness of such element. On the other hand, if more than one of the transparent elements is movable, it is preferred for the diameter of the sensor to exceed twice the total thickness of the movable elements.

The directing means can include an objective which is disposed upstream of the transparent elements and has an opening with a predetermined maximum dimension. The diameter of the active surface of the sensor is preferably greater than or equal to one-tenth of this predetermined maximum dimension. Furthermore, when only a single one of the transparent elements is movable, it is preferred for the distance between the objective and the transparent elements to be substantially greater than the thickness of this single element whereas, if two or more of the transparent elements are movable, the above distance is preferably substantially greater than the total thickness of the movable elements.

A first one of the transparent elements can have an individual transmission pattern which includes an ascending leg and a descending leg, and a second one of the elements can be substantially transparent in a predetermined wavelength range. The transparent elements are preferably selected in such a manner that one of these legs lies in the predetermined range.

It is also possible to select the transparent elements so that one of the elements has an individual transmission pattern which includes an ascending leg and a descending leg while another of the elements is substantially opaque in a preselected wavelength range. Here, again, one leg is advantageously located in the preselected range, and the apparatus can comprise means for regulating the moving means such that this leg always remains in the latter range.

The apparatus may additionally include means for exposing the master to be printed, as well as a calibration master, to radia-tion, and means for regulating the moving means so as to adjust the measuring means to the spectral sensitivity of a copy material for printing of the master. The regulating means may be arranged to regulate the moving means in response to signals generated by the sensor of the measuring means upon being impinged by radiation from the calibration master. The exposing means for the calibration master and the master to be printed may be the same.

The apparatus of the invention, which preferably constitutes a photographic printer for printing the master on photographic copy material, is particularly well-suited for carrying out the method of the invention.

The method and apparatus of the invention make it possible to closely adjust the measuring means to the different spectral sensitivities of different copy materials.

The invention is based on the recognition that the transmission lines of a measuring means can be shifted by changing the position of a component measuring element or filter relative to incoming radiation. This shifting takes place continuously rather than in discrete steps thereby allowing good agreement to be achieved between a maximum of a spectral range detected by a sensor and the spectral sensitivity of a copy material.

The novel features which are considered as characteristic of the invention are set forth in particular in the appended claim. The improved printing method, as well as the construction and mode of operation of the improved printing apparatus, together with additional features and advantages of the method and apparatus, will, however, be best understood upon perusal of the following detailed description of certain presently preferred embodiments when read in conjunction with the accompanying drawings.

DESCRIPTION OF THE PREFERRED EMBODIMENTS

Figure 1:
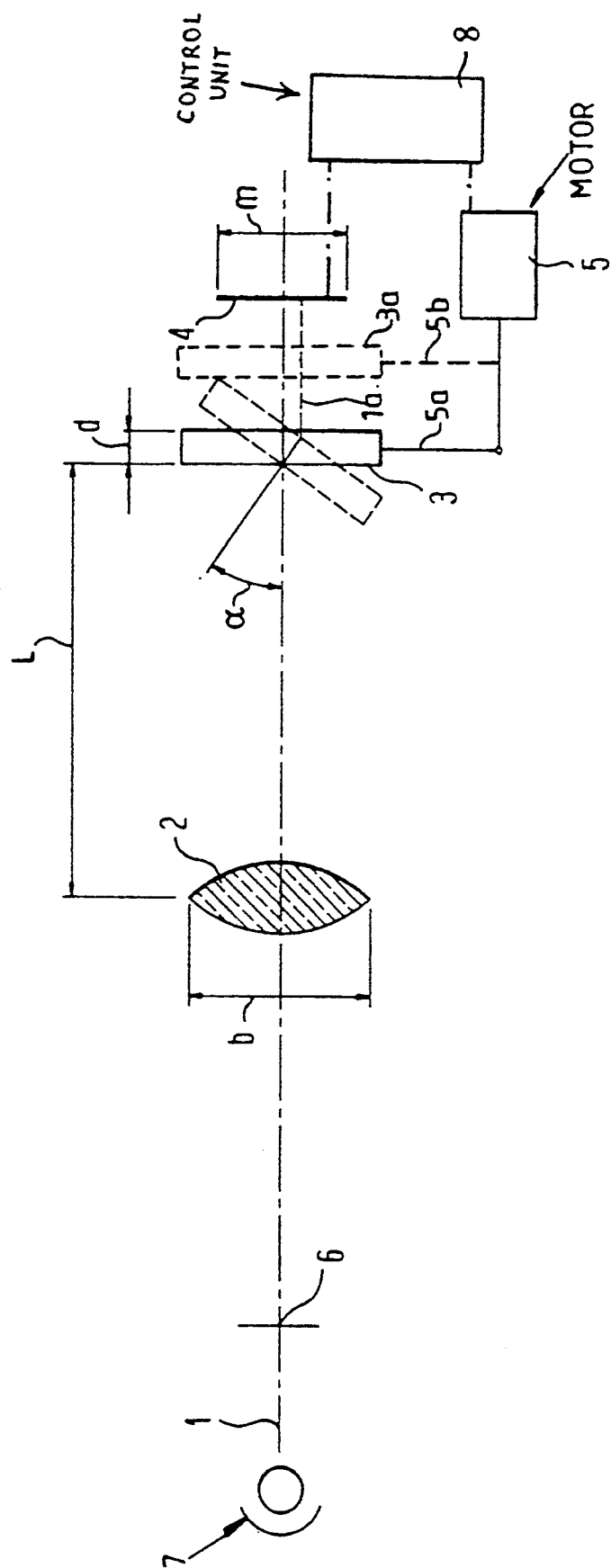
FIG. 1 schematically illustrates a printer according to the invention having a density measuring arrangement which includes a filter and a sensor for determining the intensity of a light beam after passing through the filter.

FIG. 1 schematically illustrates a photographic printer or copier according to the invention for making prints or copies of masters or originals on various types of photographic copy material. The printer includes a measuring unit or arrangement which functions to measure the density of a master. As explained below, the measuring unit is designed so that it can be adjusted to the different spectral sensitivities of the various copy materials.

The reference numeral 7 identifies a light source which generates a light beam 1 for travel along a predetermined path. The light beam 1 passes through an objective 2 and a filter 3 disposed downstream of the objective 2 before impinging on a measuring cell or sensor 4. The objective 2 has an opening with a maximum dimension "b" while the measuring cell 4 has an active surface of diameter "m". The filter 3 and the objective 2 are spaced from one another by a distance "L".

A motor 5 is connected to the filter 3 via a transmission 5a. The motor 5 allows the filter 3 to be rotated or pivoted through any desired angle alpha, e.g., from the position indicated by unbroken lines to the position indicated by broken lines. When the filter 3 is pivoted, the angle of incidence of the light beam 1 on the filter 3 is changed.

A test or calibration master 6, which is here assumed to be in the form of a negative, can be inserted between the light source 7 and the objective 2. The test negative 6 can function to restrict the wavelengths of the light beam 1 to a narrow range.

Pivoting of the filter 3 from the upright position shown by unbroken lines to the inclined position shown by broken lines has the undesirable effect of causing the optic axis to shift parallel to itself. In turn, the light beam 1 is shifted parallel to itself upon passing through the filter 3. The shifted position of the light beam 1 is indicated at 1a. The measuring unit must be designed so that the light beam 1 still impinges the active surface of the measuring cell 4 upon being shifted parallel to itself.

Shifting of the light beam 1 parallel to itself can be neglected when the thickness "d" of the filter 3 is much smaller than the diameter "m" of the active surface of the measuring cell 4. Experiments have shown that it is generally sufficient for "d" to be less than m/2.

Pivoting of the filter 3 has another undesirable effect which stems from the fact that the path through the optical medium of the filter 3 is lengthened thereby resulting in a shift of the focal point in front of the measuring cell 4. This effect can be disregarded if the distance between the objective 2 and the filter 3 is much greater than the thickness "d" of the filter 3 and/or the diameter "m" of the active surface of the measuring cell 4 is greater than or equal to one-tenth of the maximum dimension "b" of the opening of the objective 2.

Figure 2:
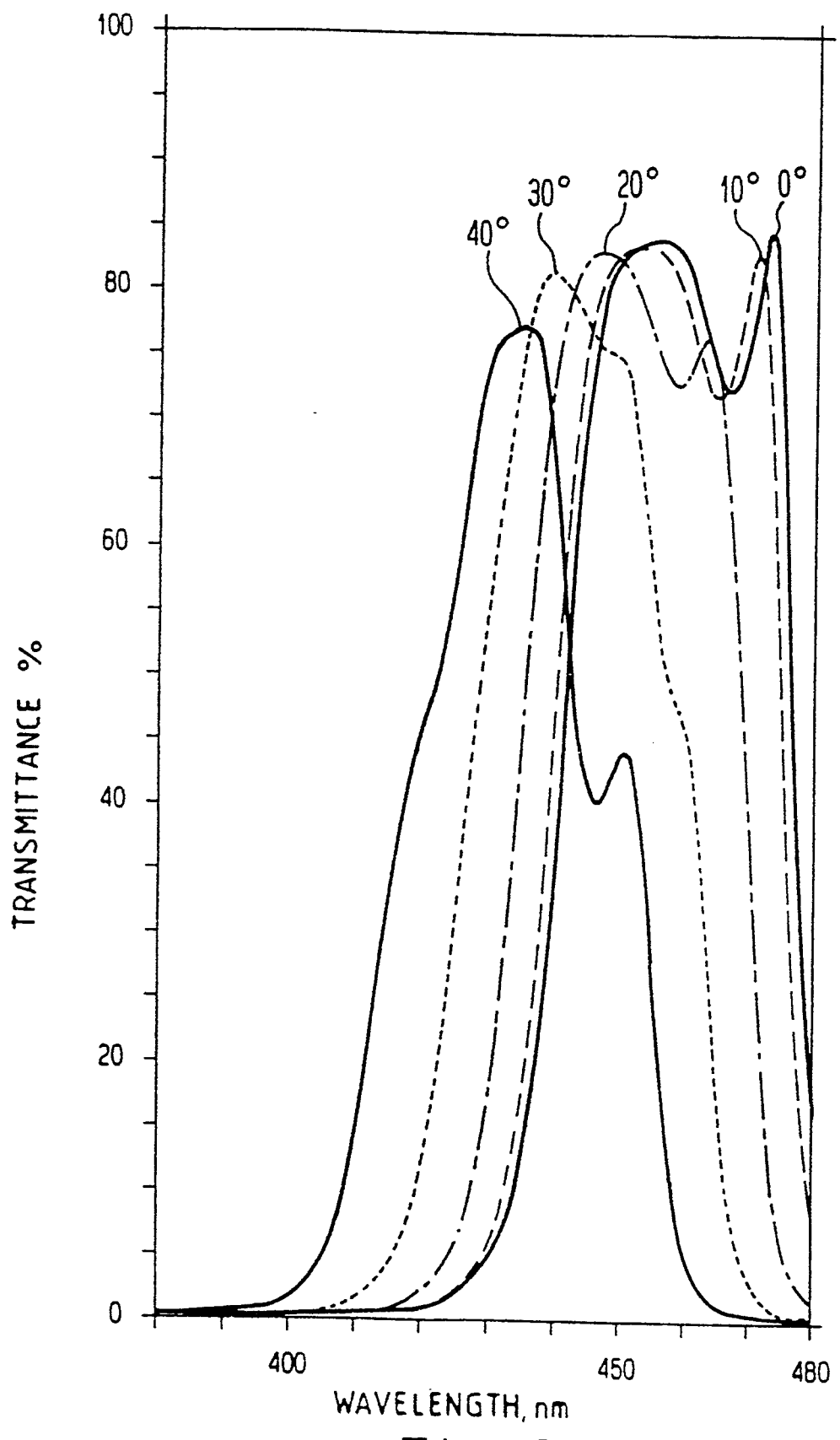
FIG. 2 is a plot of transmittance versus wavelength showing the shift in the transmission pattern of a density measuring arrangement with a single filter as a function of the angle of incidence of the light beam on the filter.

FIG. 2 shows the variation of the transmission pattern or lines of a filter with the angle alpha. The unbroken curve marked 0 degrees represents the transmission pattern before the filter is pivoted; the broken curve marked 10 degrees represents the transmission pattern when the filter has been pivoted 10 degrees; the dash-and-dot line marked 20 degrees represents the transmission pattern when the filter has been pivoted 20 degrees; the dotted line marked 30 degrees represents the transmission pattern when the filter has been pivoted 30 degrees; and the unbroken line marked 40 degrees represents the transmission pattern when the filter has been pivoted 40 degrees. Although both the transmission pattern for the unpivoted filter and the transmission pattern for the filter after having been pivoted 40 degrees are shown by unbroken lines, the differences between these transmission patterns are so obvious that there is no danger of confusion.

It will be observed that each of the transmission patterns has an ascending leg or flank on the left and a descending leg or flank on the right.

Figure 3:
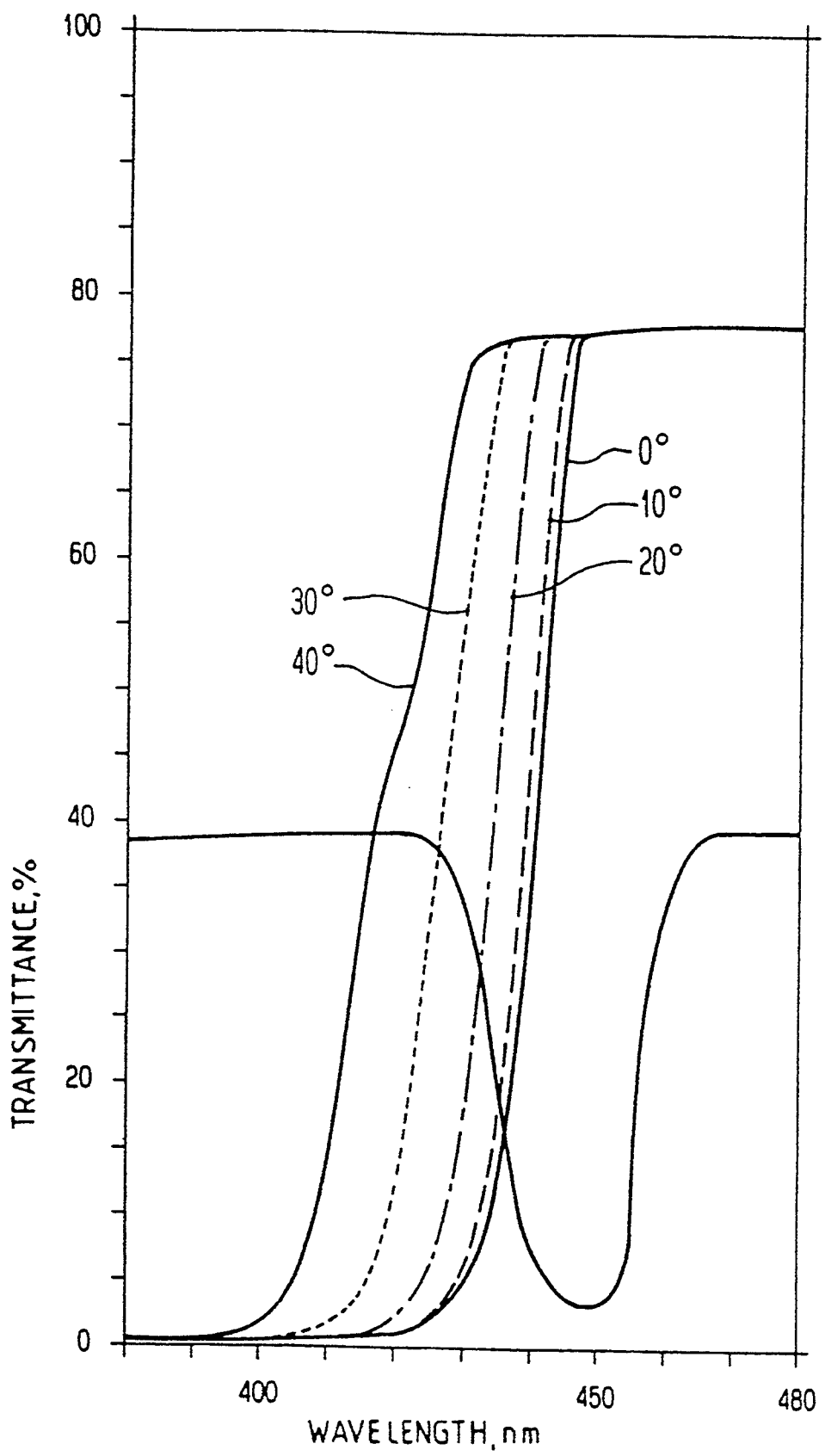
FIG. 3 is similar to FIG. 2 but with the transmission pattern of a test master superimposed on the transmission patterns of a filter.

FIG. 3 is similar to FIG. 2 but illustrates only the ascending legs of the transmission patterns for a filter in the positions of FIG. 2. However, in addition to the filter transmission patterns, FIG. 3 shows the transmission pattern or line for a negative, such as the test negative 6, exposed in the green wavelength range.

The transmission pattern of the negative is linear and horizontal up to 425 nm. Thus, since the negative was not exposed in this range, no darkening took place. The greatest darkening occurred in the wavelength range around 450 nm and, inasmuch as the negative was darkened to the greatest extent in such range, the transmittance, i.e., the light allowed through is minimal. Beyond the latter range, the transmittance increases with increasing wavelength and, at approximately 470 nm, again becomes linear and horizontal.

It can be clearly seen from FIG. 3 that the filter transmission pattern at an angle or rotation of 30 degrees intersects the transmission pattern of the negative exposed in the green wavelength range at about 425 nm. This is where the negative transmission pattern begins to fall due to exposure of the negative. The intersection point can be readily detected as will be described with reference to FIG. 4.

Figure 4:
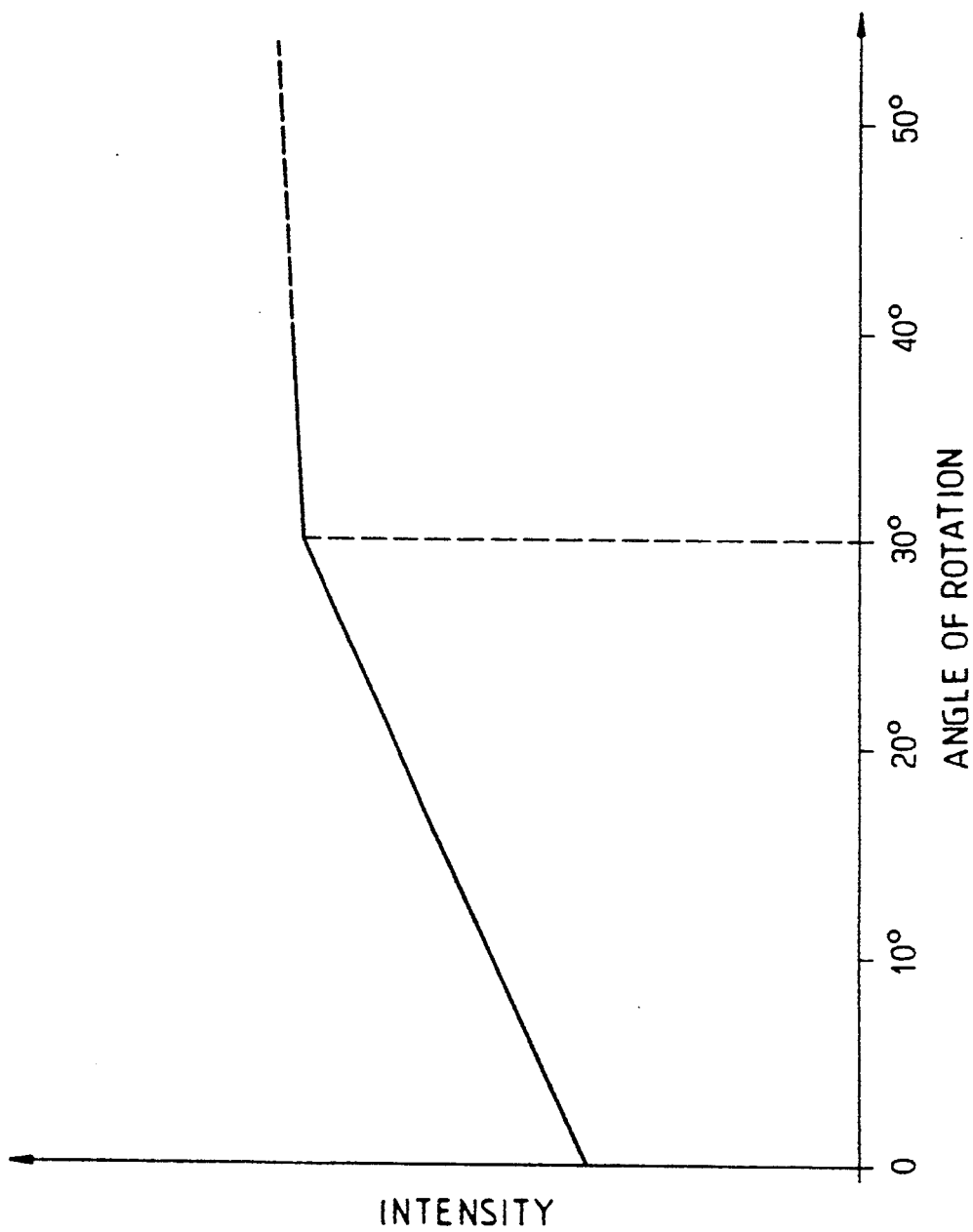
FIG. 4 is a plot of the intensity of the light beam as measured by the sensor of FIG. 1 versus the angle of rotation of the filter of FIG. 1.

FIG. 4 is a plot of the intensity of the light passing through the test negative 6 and the filter 3 as a function of the angle of rotation, alpha, of the filter 3. The plot represents the spectral integral of the amount of light which passes through the test negative 6 and the filter 3 in dependence upon the rotational angle, alpha. As seen from FIG. 3, only the spectral portions of the light beyond about 435 nm arrive at the measuring cell 4 when the filter 3 is upright. Such spectral portions form the starting point of the integral plot of FIG. 4. When the rotational angle, alpha, is increased, the transmission pattern of the filter 3 shifts. The transmitted light includes a larger spectral range and the plot of FIG. 4 accordingly rises. The increase in intensity is initially great because, during the initial pivoting of the filter 3, the ascending leg of the filter transmission pattern shifts in precisely that spectral range which contains the descending leg or flank of the transmission pattern of the test negative 6. With reference to FIG. 3, this range extends from about 450 nm to about 425 nm. In such range, a change in the rotational angle, alpha, causes the measuring cell 4 to sense a greater spectral region.

Light from the spectral range above 425 nm arrives at the measuring cell 4 when the filter 3 has been pivoted through an angle of 30 degrees. Further pivoting of the filter 3, e.g., to a rotational angle, alpha, of 40 degrees, allows light from a wavelength of about 415 nm on up to impinge the measuring cell 4. In the angular range above 30 degrees, the integral plot of FIG. 4 does not rise as steeply as between 0 and 30 degrees. Thus, the transmittance of the test negative 6 no longer changes in such range so that the slope of the integral plot of FIG. 4 is accordingly smaller.

The point of inflection in the plot of FIG. 4, which occurs at a rotational angle of 30 degrees for the filter 3, corresponds to the point at which the transmission pattern of the test negative 6 begins to fall.

When used in conjunction with a test negative where the point at which the transmission pattern begins to fall is known, this inflection point can be employed to determine the angular position, alpha, of the filter 3. The rotational angle, alpha, of the filter 3 is continuously increased and the inflection point is detected by means of the measuring cell 4 and an electronic control unit or regulating means 8 which is connected to the measuring cell 4 and the motor 5. The wavelength at which the negative transmission pattern begins to fall is known. Also known is the rotational angle, alpha prime, at which the filter transmission pattern intersects the point of the negative transmission pattern where the latter begins to fall. Since the inflection point of the integral plot of FIG. 4 lies precisely at this angle, alpha prime, it can be concluded that the filter 3 was pivoted exactly through the angle, alpha prime, when the inflection point is reached. This enables the control unit 8 to achieve a very precise adjustment of the filter 3 and its transmission pattern. The control unit 8 regulates the motor 5, and hence adjusts the filter 3, in response to signals which are generated by the measuring cell 4 upon being impinged by the light beam 1.

As is observable from FIG. 2, both the ascending and descending legs of the filter transmission pattern shift when the rotational angle, alpha, is changed. For adjustment to the copy material being used, it is necessary that the ascending leg and the descending leg each be adjusted to the respective spectral sensitivity of the copy material.

To this end, a combination of several individual filters can be used. Such a combination is schematically illustrated in FIG. 1 where the reference numeral 3a identifies an additional filter. The filter combination has an overall transmission pattern which has an ascending leg and a descending leg and is the product of the respective transmission patterns of the individual filters 3,3a.

One possibility when using the filter combination is to pivot the individual filters 3,3a through different distances. This is schematically illustrated in FIG. 1 where the reference numeral 5b identifies a transmission which couples the additional filter 3a to the motor 5 and permits the additional filter 31 to be pivoted through a different angle than the filter 3. Such an arrangement enables the ascending leg and the descending leg of the overall transmission pattern of the filter combination to be adjusted to the copy material independently of one another. In this way, the spectral sensitivity of the measuring unit can be made to approxi-mate the spectral sensitivity of the copy material with a high degree of precision.

Another possibility in the case of the filter combination is to pivot one of the filters 3,3a while maintaining the other stationary. In one modification, the materials for the respective filters 3,3a are selected in such a manner that, for instance, the descending leg of the overall transmission pattern remains substantially unaffected as the ascending leg is shifted. Here, the descending leg of the transmission pattern of the pivoted filter is located far outside the required spectral region and the actual bounding of the spectral region is accomplished with another filter type such as, for example, a mass filter or foil filter. Since the angular dependence of mass filters is much less than that of interference filters, the descending leg of a mass filter is virtually unaffected by pivoting.

Figure 5:
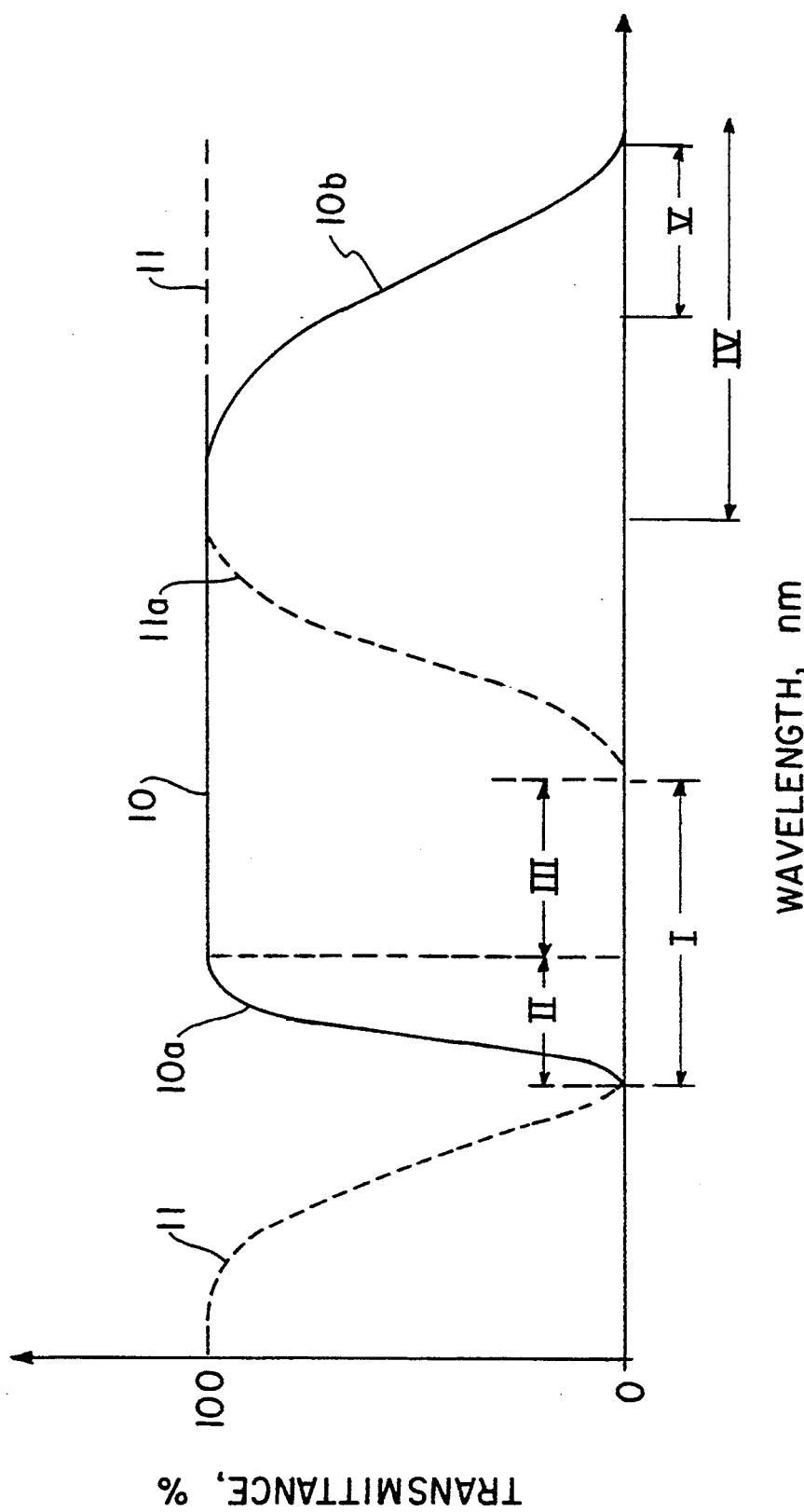
FIG. 5 is a plot of transmittance versus wavelength illustrating the shift in the transmission pattern of a density measuring arrangement with two filters as one filter is moved relative to the other.

In another modification, the transmission pattern of one filter has a leg or flank which is located in a wavelength range where the other filter is virtually completely transparent. This is illustrated in FIG. 5 which shows a transmission pattern 10 in an unbroken line and a transmission pattern 11 in a broken line. The transmission pattern 10 is assumed to correspond to the filter 3 and the transmission pattern 11 to the filter 3a. It is further assumed that the filter 3 is pivotable whereas the filter 3a is fixed.

As can be seen from the transmission pattern 11, the filter 3a is opaque over a wavelength range I and essentially completely transparent in a wavelength range IV. The transmission pattern of the filter 3 has an ascending leg 10a which lies in the wavelength range I and spans a wavelength range II. The transmission pattern of the filter 3 further has a descending leg 10b which is located in the wavelength range IV and which is adjustable by the following steps:

By rotating the filter 3, the transmission pattern 10 of this filter can be shifted in its entirety to either higher or lower wavelengths. In FIG. 5, the ascending leg 10a of the transmission pattern 10 is at the low wavelength limit of the wavelength range I in which the filter 3a is opaque. This means that the transmis-sion pattern 10 of the filter 3 is shiftable towards higher wavelengths through a wavelength span III without causing the ascending leg 10a to leave the wavelength range I. Movement of the ascending leg 10a across the wavelength span III is accompanied by a corresponding movement of the descending leg 10b through a wavelength span V.

The resultant transmittance in the wavelength range I is essentially zero. Consequently, as long as the ascending leg 10a remains in the wavelength range I, the transmission pattern of the filter combination changes only in the wavelength span V as the filter 3 is rotated. The control unit 8 can be designed to adjust the filter 3 in such a manner that the ascending leg 10a is always in the wavelength range I. A similar procedure as described above for filter 3 is possible for second filter 3a: By rotating filter 3a the ascending leg of corresponding transmission pattern 11 is independently adjustable.

For a printer having only a single filter 3, it was pointed out that shifting of the optic axis parallel to itself can be neglected when the thickness "d" of the filter 3 is less than m/2, i.e., less than one-half of the diameter of the active surface of the measuring cell 4. It was also pointed out that a shift of the focal point in front of the measuring cell 4 can be disregarded if the distance L between the objective 2 and the filter 3 is much greater than the thickness "d" of the filter 3. These conditions hold true for the filter combination when the filter 3a is fixed and only the filter 3 is pivotable. On the other hand, when both of the filters 3,3a are pivotable, the total thickness of the filters 3,3a should be less than m/2 for shifting of the optic axis to be negligible. Similarly, the distance L between the objective 2 and the filter 3 when the two filters 3,3a are pivotable should be substantially greater than the total thickness of the filters 3,3a in order for shifting of the focal point to be disregarded.

The measuring cell 4 in the photographic printer of FIG. 1 is conventional and, as in known printers, serves to measure light which has been passed through a master to be printed. The resulting measurements are used to control the exposure during printing. In the illustrated embodiment, the measuring cell 4 is further employed to sense the transmittance of the filter 3 or the filter combination including the filters 3,3a. The dual function of the measuring cell 4 makes it possible to dispense with an expensive additional measuring arrangement. Moreover, the use of the measuring cell 4, which is disposed directly in the printer, for a determination of the transmittance of the filter 3 or the filters 3,3a allows the printer to be directly adjusted to different photographic copy materials.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A method of printing a master on copy material having a predetermined spectral sensitivity, comprising the steps of:
    providing a source of radiation;
    measuring the density of said master using measuring means which includes a plurality of measuring elements transparent to the radiation, said measuring means having a transmission pattern with an ascending leg and a descending leg which shifts in dependence upon the angle of incidence of radiation on said elements; and
    adjusting said measuring means to said predetermined spectral sensitivity, the adjusting step including moving at least one of said elements independently of another of said elements so as to change the angle of incidence of radiation on said one element, which move results in the shifting of the ascending leg of the pattern differently from the descending leg.

2. The method of claim 1, wherein at least one of said elements comprises a filter.

3. The method of claim 1, wherein the adjusting step of moving the said one element comprises rotating said one element.

4. The method of claim 1, wherein the adjusting step further comprises directing the radiation in a beam towards said elements, and restricting said beam to a narrow wavelength range.

5. The method of claim 4, wherein the adjusting step further comprises determining the intensity of said beam following passage of said beam through said elements.

6. The method of claim 5, wherein the adjusting step further comprises changing the position of said one element with reference to said beam in dependence upon the determination of the intensity.

7. The method of claim 1, wherein said shifting of said transmission pattern is accomplished by moving said one element through a first distance and either maintaining said other element stationary or moving said other element through a second distance different from said first distance.

8. An apparatus for printing a master, comprising:
    means for providing radiation to the master;
    means for measuring the density of the master including a plurality of elements which are transparent to the radiation, said measuring means having a transmission pattern which shifts in dependence upon the angle of incidence of radiation on said elements, said elements including a first element which affects the increasing edge of the transmission pattern and a second element which affects the decreasing edge of the transmission pattern; and
    means for moving each of said first and second elements independently of each other to change the angle of incidence of the radiation on each of said first and second elements.

9. The apparatus of claim 8, wherein at least one of said first and second elements comprises a filter.

10. The apparatus of claim 8, wherein said moving means comprises means for rotating at least one of said first and second elements.

11. The apparatus of claim 8, further comprising means for directing the radiation towards said first and second elements along a predetermined path, and means for restricting the directed radiation to a narrow wavelength range.

12. The apparatus of claim 11, wherein said measuring means comprises means downstream of said first and second elements relative to the radiation from the source for determining the intensity of the radiation.

13. The apparatus of claim 8, further comprising means for directing radiation towards said first and second elements along a predetermined path, said measuring means including a sensor downstream of said first and second elements relative to the radiation from the source for determining the intensity of the radiation.

14. The apparatus of claim 8, further comprising an objective which is disposed at a predetermined distance from said elements; and wherein more than one of said elements is movable by said moving means, said movable elements having a combined predetermined thickness, and said predetermined distance being substantially greater than said predetermined thickness.

15. A method of printing a master on copy material having a predetermined spectral sensitivity comprising the steps of:
    providing a source of radiation;
    measuring the density of said master using measuring means which includes a plurality of measuring elements transparent to the radiation, said measuring means having a transmission pattern which shifts in dependence upon the angle of incidence of the radiation on said elements, at least one of said elements having a transmission pattern which includes an ascending leg and a descending leg and another of said elements being substantially transparent in a predetermined wavelength range, one of said legs lying in said range; and
    adjusting said measuring means to said predetermined spectral sensitivity, the adjusting step including moving said at least one of said elements and said other element relative to each other to change the angle of incidence of radiation thereon to shift said one leg of said pattern and said range relative to one another.

16. A method of printing a master on copy material having a predetermined spectral sensitivity comprising the steps of:
    providing a source of radiation;

measuring the density of said master using measuring means which includes a plurality of measuring elements transparent to the radiation, said measuring means having a transmission pattern which shifts in dependence upon the angle of incidence of the radiation on said elements, at least one of said elements having a transmission pattern which includes an ascending leg and a descending leg and another one of said elements being substantially opaque in a predetermined wavelength range, one of said legs lying in said range, and adjusting said measuring means to said predetermined spectral sensitivity, the adjusting step including moving said at least one of said elements and said other element relative to each other to change the angle of incidence of radiation thereon to shift said one leg and said range relative to one another.

17. The method of claim 15, wherein the adjusting step is performed to always maintain said one leg in said range.

18. A method for a photographic printer of printing a master on copy material having a predetermined spectral sensitivity, comprising the steps of:

providing a source of radiation;

measuring the density of said master in the photographic printer using measuring means which includes a plurality of measuring elements transparent to the radiation and a sensor, said measuring means having a transmission pattern which shifts in dependence upon the angle of incidence of radiation on said elements and said sensor for determining radiation sensitivity, the measuring step including exposing said master to the radiation and directing the radiation from said master to said sensor; and adjusting said measuring means to said predetermined spectral sensitivity, including moving at least one of said elements independently of another of said elements to change the angle of incidence of radiation on said one element, the adjusting step also including exposing a calibration master to radiation and directing radiation from said calibration master to said sensor.

19. A method for a photographic printer of printing a master on copy material having a predetermined spectral sensitivity, comprising the steps of:

providing a source of radiation;

measuring the density of said master in the photographic printer using measuring means which includes a plurality of measuring elements transparent to the radiation, said measuring means having a transmission pattern which shifts in dependence upon the angle of incidence of radiation on said elements;

adjusting said measuring means to said predetermined spectral sensitivity, including moving at least one of said elements independently of another of said elements to change the angle of incidence of radiation on said one element, the adjusting step also including evaluating a calibration master in the printer.

20. An apparatus for printing a master, comprising:

means for providing radiation to the master;

means for measuring the density of the master including a plurality of elements which are transparent to the radiation;

means for directing radiation toward said elements along a predetermined path, said measuring means having a transmission pattern which shifts in dependence upon the angle of incidence of the radiation on said elements and said measuring means including a sensor downstream of said elements relative to the radiation from the source for determining the intensity of the radiation; and means for moving at least one of said elements independently of another of said elements to change the angle of incidence of the radiation on said one element with more than one of said elements being movable by said moving means, said sensor having an active surface of predetermined diameter, and said movable elements having a combined predetermined thickness less than one-half of said predetermined diameter.

21. An apparatus for printing a master, comprising:

means for providing radiation to the master;

means for measuring the density of the master including a plurality of elements which are transparent to the radiation;

means for directing radiation toward said elements along a predetermined path, said measuring means having a transmission pattern which shifts in dependence upon the angle of incidence of the radiation on said elements and including a sensor downstream of said elements relative to the radiation from the source for determining the intensity of the radiation; and means for moving at least one of said elements independently of another of said elements to change the angle of incidence of the radiation on said one element, said directing means comprising an objective upstream of said elements relative to the radiation from the source having an opening with a predetermined maximum dimension, and said sensor having an active surface of predetermined diameter greater than or equal to one-tenth of said predetermined maximum dimension of said objective.

22. An apparatus for printing a master, comprising:

means for providing radiation to the master;

means for measuring the density of the master including a plurality of elements which are transparent to the radiation;

means for directing the radiation toward said elements along a predetermined path;

said measuring means having a transmission pattern which shifts in dependence upon the angle of incidence of radiation on said elements and including a sensor downstream of said elements relative to the radiation from the source for determining the intensity of the radiation; and means for moving at least one of said elements independently of another of said elements to change the angle of incidence of the radiation on said one element with only said one element being movable by said moving means, said sensor having an active surface of predetermined diameter, and said one movable element having a predetermined thickness less than one-half of said predetermined diameter of said sensor.

23. An apparatus for printing a master comprising:

means for providing radiation to the master;

means for measuring the density of the master including a plurality of elements which are transparent to the radiation, said measuring means having a transmission pattern which shifts in dependence upon the angle of incidence of the radiation on said elements;

means for moving at least one of said elements independently of another of said elements to change the angle of incidence of the radiation on said at least one element, and an objective which is disposed at a predetermined distance from said elements; and wherein only said at least one element is movable by said moving means, said at least one element having a predetermined thickness, and said predetermined distance being substantially greater than said predetermined thickness.

24. An apparatus for printing a master, comprising:
means for providing radiation to the master;
means for measuring the density of the master including a plurality of elements which are transparent to the radiation, said measuring means having a transmission pattern which shifts in dependence upon the angle of incidence of the radiation on said elements, at least one of said elements having a transmission pattern which includes an ascending leg and a descending leg and another one of said elements being substantially transparent in a predetermined wavelength range, one of said legs lying in said range; and
means for moving said at least one element and said other element relative to each other to change the angle of incidence of the radiation thereon to shift said one leg of said pattern and said range relative to each other.

25. An apparatus for printing a master, comprising:
means for providing radiation to the master;
means for measuring the density of the master including a plurality of elements which are transparent to the radiation, said measuring means having a transmission pattern which shifts in dependence upon the angle of incidence of the radiation on said elements, at least one of said elements having a transmission pattern which includes an ascending leg and a descending leg and another of said elements being substantially opaque in a predetermined wavelength range, one of said legs lying in said range; and
means for moving said at least one element and said other element relative to each other to change the angle of incidence of the radiation thereon to shift said one leg of said pattern and said range relative to each other.

26. The apparatus of claim 25, further comprising means for regulating said moving means to always maintain said one leg in said range.

27. An apparatus for printing a master on photographic copy material having a predetermined spectral sensitivity comprising:
means for exposing the master to radiation;
means for measuring the density of the master including a plurality of elements which are transparent to the radiation, said measuring means having a transmission pattern which shifts in dependence upon the angle of incidence of the radiation on said elements;

means for moving at least one of said elements independently of another of said elements to change the angle of incidence of the radiation on said at least one element;
means for regulating said moving means to adjust said measuring means to the spectral sensitivity of the copy material,
said measuring means including a sensor for determining the intensity of radiation coming from the master, and said regulating means being arranged to regulate said moving means in response to signals generated by said sensor upon being impinged by radiation from a calibration master.

28. An apparatus for printing a master on photographic copy material having a predetermined spectral sensitivity, comprising:
means for producing radiation to expose the master;
means for measuring the density of the master including a plurality of elements which are transparent to the radiation, said measuring means having a transmission pattern which shifts in dependence upon the angle of incidence of the radiation on said elements;
means for moving at least one of said elements independently of another of said elements to change the angle of incidence of radiation on said one element;
means for exposing a calibration master to the radiation, and
means for regulating said moving means in response to radiation coming from the calibration master to adjust said measuring means to the spectral sensitivity of the copy material.

29. A method of calibrating a system for printing a copy master having a predetermined spectral sensitivity comprising the steps of:
providing a source of radiation of a given spectrum;
providing a test negative having a predetermined transmission pattern to said radiation with respective edges of increasing and decreasing transmission;
measuring the radiation transmitted through said test negative using measuring means which includes at least one measuring element transparent to the radiation and having a transmission pattern with respective edges of increasing and decreasing transmission which shift in dependence upon the angle of incidence of the radiation upon said at least one element;
moving said at least one element of said measuring means to change the angle of incidence of the radiation thereon; and
determining the position to which said at least one element is moved to achieve an angle of incidence at which one of the edges of the transmission pattern of said at least one element coincides with a corresponding one of said edges of said test negative pattern.

30. The method of claim 29, wherein the step of moving comprises rotating said least one element and the determining step comprises determining the angle of rotation of said at least one element.

* * * * *